(12) United States Patent
Isaka et al.

(10) Patent No.: US 8,654,228 B2
(45) Date of Patent: Feb. 18, 2014

(54) IMAGING APPARATUS, CAMERA BODY AND INTERCHANGEABLE LENS

(75) Inventors: Haruo Isaka, Kyoto (JP); Mikio Sakurai, Osaka (JP); Yasuhiro Nakagai, Osaka (JP)

(73) Assignee: Panasonic Corporation, Osaka (JP)

( * ) Notice: Subject to any disclaimer, the term of this patent is extended or adjusted under 35 U.S.C. 154(b) by 318 days.

(21) Appl. No.: 13/048,332

(22) Filed: Mar. 15, 2011

(65) Prior Publication Data

US 2011/0228163 A1    Sep. 22, 2011

(30) Foreign Application Priority Data

Mar. 17, 2010    (JP) ................................ 2010-060595

(51) Int. Cl.
*H04N 3/14*    (2006.01)
*H04N 5/335*   (2011.01)

(52) U.S. Cl.
USPC .......................................... 348/296; 348/251

(58) Field of Classification Search
USPC ................................................. 348/296, 251
See application file for complete search history.

(56) References Cited

U.S. PATENT DOCUMENTS

| | | | |
|---|---|---|---|
| 7,995,136 B2 * | 8/2011 | Endo et al. .................... | 348/362 |
| 2008/0266442 A1 * | 10/2008 | Wakano et al. ............... | 348/340 |
| 2009/0015704 A1 | 1/2009 | Namai et al. | |

FOREIGN PATENT DOCUMENTS

| | | | | |
|---|---|---|---|---|
| JP | 2003-244526 | | 8/2003 | |
| JP | 2007-053742 | | 3/2007 | |
| JP | 2006-060796 A | * | 3/2008 | ............... G03B 7/02 |
| JP | 2008-060796 | | 3/2008 | |
| JP | 2008-311711 | | 12/2008 | |
| JP | 2009-141805 | | 6/2009 | |
| JP | 2010-041510 | | 2/2010 | |

* cited by examiner

*Primary Examiner* — Anthony J Daniels
(74) *Attorney, Agent, or Firm* — Panasonic Patent Center

(57) ABSTRACT

An imaging apparatus includes an optical system configured to collect subject light, an imaging device having an electronic front curtain function, configured to receive the subject light to generate an image signal, a data storage unit configured to store an exit pupil distance of the optical system and a correction amount of the exit pupil distance, a mechanical shutter capable of cutting off the subject light passing through the optical system to the imaging device, and a correction unit configured to obtain the exit pupil distance of the optical system and the correction amount of the exit pupil distance from the data storage unit, obtain a corrected exit pupil distance using the obtained exit pupil distance of the optical system and a correction amount of the exit pupil distance, and correct brightness unevenness of the image signal based on the corrected exit pupil distance.

11 Claims, 16 Drawing Sheets

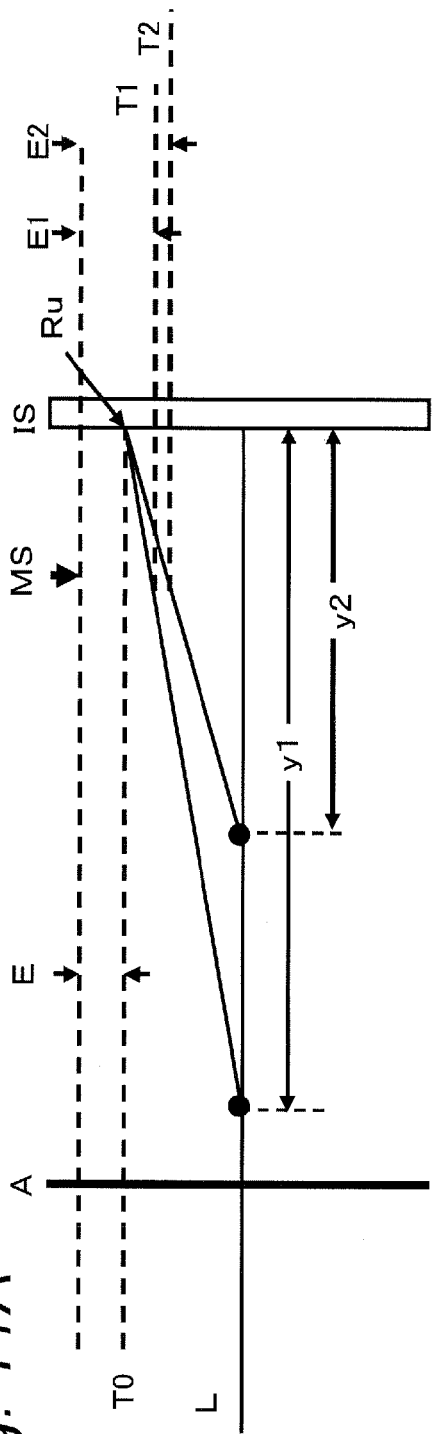
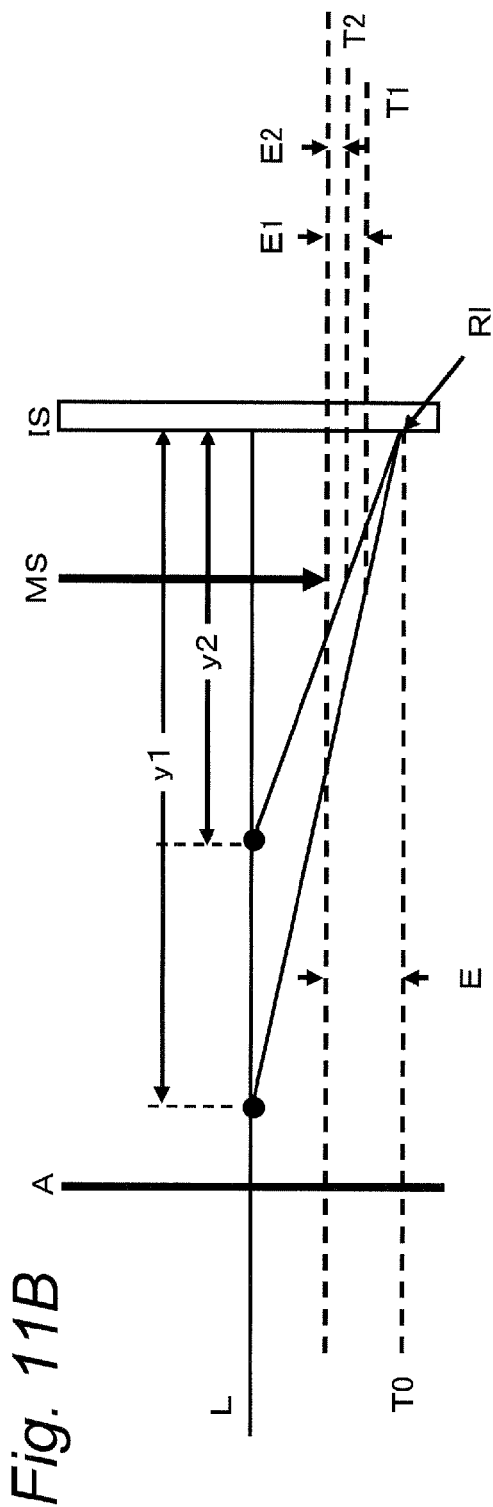
Fig. 11A
Fig. 11B

IMAGING APPARATUS, CAMERA BODY AND INTERCHANGEABLE LENS

BACKGROUND

1. Technical Field

The technical field relates to an imaging apparatus for generating image data based on an optical subject image by means of an imaging device, and more particularly to the imaging apparatus adopting an electronic front curtain as a shutter means.

2. Related Art

Resetting electric charges of an imaging device per line allows a function similar to a front curtain of a mechanical shutter to be realized. Such exposure control is occasionally called "electronic front curtain". In this case, only a rear curtain is driven in the mechanical shutter for the exposure. An exposure time is determined by a time elapsing from resetting of electric charges of the imaging device per line to running of the rear curtain of the mechanical shutter. Therefore, by determining a timing at which the electric charges of the imaging device per line is reset according to running characteristics of the rear curtain of the mechanical shutter, the exposure time on all the lines can be maintained constant.

The mechanical shutter is spaced from the imaging device in a direction of an optical system. Therefore, a light shielding position on the imaging device with the rear curtain of the mechanical shutter changes according to influences of a focal distance, an exit pupil distance of an optical system, and the like. For this reason, when reset characteristics of the electronic front curtain for all lines are made constant according to the characteristics of the mechanical shutter, uneven exposure amount occurs depending on regions of the imaging device.

The imaging apparatus described in JP2007-53742A controls a time elapsing from the resetting of electric charges of the imaging device in each line to the running of the rear curtain of the mechanical shutter on the respective line to vary according to the regions of the imaging device. This arrangement can reduce uneven exposure amount on the regions of the imaging device.

The imaging apparatus disclosed in JP2007-53742A determines a scanning curve pattern of the electronic front curtain based on a focal distance, an exit pupil distance, an aperture value, and a focus position of the optical system. However, the exit pupil distance may change due to an imaging condition and an image height on the imaging device. Further, brightness unevenness might occur due to vignetting, but an influence of the vignetting is not taken into consideration by JP2007-53742A.

SUMMARY

An imaging apparatus capable of solving the above problem is provided that satisfactorily corrects brightness unevenness of an image which would be caused by an electronic front curtain.

In a first aspect, an imaging apparatus is provided which includes an optical system for collecting subject light, an imaging device having an electronic front curtain function, configured to receive the subject light to generate an image signal, a data storage unit configured to store an exit pupil distance of the optical system and correction amount of the exit pupil distance, a mechanical shutter capable of cutting off the subject light passing through the optical system to the imaging device, and a correction unit configured to obtain the exit pupil distance of the optical system and the correction amount of the exit pupil distance from the data storage unit, obtain a corrected exit pupil distance using the obtained exit pupil distance of the optical system and correction amount of the exit pupil distance, and correct brightness unevenness of the image signal based on the corrected exit pupil distance.

In a second aspect, a camera body to which an interchangeable lens is mountable is provided. The camera body includes an imaging device having an electronic front curtain function, configured to generate an image signal from subject light which is received through an optical system of the interchangeable lens, a mechanical shutter capable of cutting off the subject light passing through the optical system to the imaging device, a communication unit configured to receive an exit pupil distance of the optical system of the interchangeable lens and correction amount of the exit pupil distance, from the interchangeable lens, and a correction unit configured to obtain a corrected exit pupil distance using the received exit pupil distance of the optical system and the received correction amount of the exit pupil distance, and correct brightness unevenness of the image signal based on the corrected exit pupil distance.

In a third aspect, an interchangeable lens mountable to a camera body is provided. The interchangeable lens includes an optical system configured to collect subject light, a data storage unit configured to store an exit pupil distance of the optical system and correction amount of the exit pupil distance, and a communication unit configured to transmit the exit pupil distance of the optical system and the correction amount of the exit pupil distance stored in the data storage unit to the camera body.

The imaging apparatus of the above aspect corrects the exit pupil distance of the optical system in view of an influence of an image height or vignetting, and corrects the brightness unevenness using the corrected exit pupil distance, so that the brightness unevenness that would be caused by the electronic front curtain can be satisfactorily corrected.

BRIEF DESCRIPTION OF DRAWINGS

FIGS. 11A and 11B are diagrams for explaining correction of uneven brightness.

DETAILED DESCRIPTION OF PREFERRED EMBODIMENTS

Embodiments are described below with reference to the accompanying drawings.

First Embodiment

1. Configuration

Figure 1:
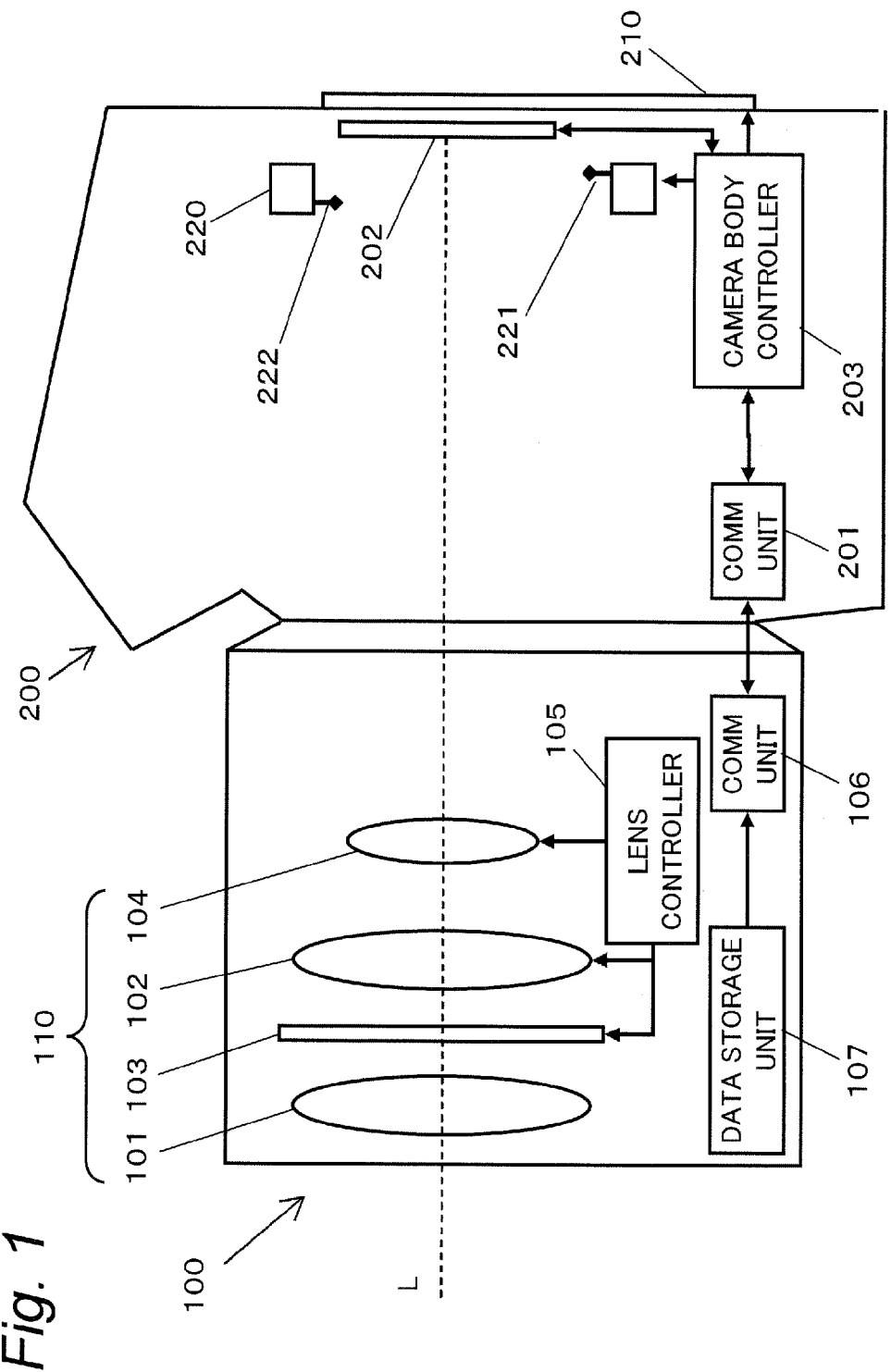
FIG. 1 is a constitutional diagram illustrating an imaging apparatus according to an embodiment.

FIG. 1 is a configuration diagram illustrating the imaging apparatus according to a first embodiment. The imaging apparatus includes an interchangeable lens 100 and a camera body 200. The interchangeable lens 100 can be attached to a predetermined position in the camera body 200. The interchangeable lens 100 attached to the camera body can electrically communicate with the camera body 200.

1-1. Interchangeable Lens

The interchangeable lens 100 has an objective lens 101, a diaphragm unit 103, a zoom lens 102, a focus lens 104, an interchangeable lens controller 105, a communication unit 106 and a data storage unit 107.

The interchangeable lens controller 105 is an LSI in which a CPU is integrated with a control circuit for controlling respective units of the interchangeable lens 100. The interchangeable lens controller 105 can drive the diaphragm unit 103, the zoom lens 102 and the focus lens 104 in synchronization with a reference signal output from the camera body, based on an operation request output from a camera body controller 203 via the communication unit 106. Actuators are provided to the diaphragm unit 103, the zoom lens 102 and the focus lens 104, respectively, for driving them. In FIG. 1, the actuators are not shown.

The interchangeable lens controller 105 can change a aperture value of the diaphragm unit 103 based on an operation request output from the camera body. The interchangeable lens controller 105 can move the zoom lens 102 forward and backward in a direction of an optical axis L based on an operation request output from the camera body 200. This operation allows a focal distance of an optical system 110 including the objective lens 101, the diaphragm unit 103, the zoom lens 102 and the focus lens 104 to be changed. The interchangeable lens controller 105 can move the focus lens 104 forward and backward in the direction of the optical axis L. This operation allows a subject image to be focused on an imaging device 202.

The data storage unit 107 stores a program for operating the interchangeable lens controller 105 and information specific to the interchangeable lens 100. The data storage unit 107 can be realized by a nonvolatile memory such as a flash memory.

1-2. Camera Body

The camera body 200 has a communication unit 201, the imaging device 202, the camera body controller 203, a mechanical shutter 220, and a liquid crystal monitor 210. The camera body 200 further has a release button used by a user to instruct recording of an image, and a recording medium such as a memory card for storing image data obtained by the recording operation, however, they are not shown in FIG. 1.

The camera body controller 203 is an LSI in which a CPU, a control circuit for controlling respective units in the camera body 200 and a signal processing circuit for executing various signal processes are integral with each other. The camera body controller 203 controls the respective units in the camera body 200, and outputs an operation request to the interchangeable lens controller 105 via the communication unit 106 of the interchangeable lens 100 and the communication unit 201 of the camera body 200. The camera body controller 203 can obtain information specific to the interchangeable lens 100 stored in the data storage unit 107 via the communication unit 201 and the communication unit 106.

The camera body controller 203 can output a vertical synchronizing signal to the imaging device 202 and can control an operation of the imaging device 202. The camera body controller 203 can reset electric charges of the imaging device 202 per line, thereby allowing the imaging device 202 to execute an electronic front curtain operation. The camera body controller 203 can control an operation of the mechanical shutter 220. The camera body controller 203 can drive a front curtain 221 and a rear curtain 222 of the mechanical shutter 220 independently. Therefore, the camera body controller 203 runs the front curtain 221 of the mechanical shutter 220, and then allows the imaging device 202 to execute the electronic front curtain operation. Thereafter, the camera body controller 203 runs the rear curtain 222 of the mechanical shutter 220 so that the imaging device 202 can be exposed. For capturing an image with the electronic front curtain operation, it is sufficient that the mechanical shutter 220 is open after the running of the front curtain 221. Although permissible, the front curtain 221 of the mechanical shutter 220 is not required to be run every time the image is recorded (taken). Further, the camera body 200 adopts the mechanical shutter 220 having the front curtain 221 and the rear curtain 222, and thus can perform a normal image capturing operation by means of a combination of the front curtain 221 and the rear curtain 222 of the mechanical shutter 220.

The mechanical shutter 220 may be a so-called one-curtain shutter that does not have a font curtain. In this case, it goes without saying that it does not need to run the front curtain in advance.

The camera body controller 203 executes various signal processes on an image signal output from the imaging device 202 to generate image data. At this time, the camera body controller 203 can use the information specific to the interchangeable lens 100 obtained from the data storage unit 107. The camera body controller 203 enables an image based on the image data obtained by the various signal processes on a liquid crystal monitor 210. When the image signal output from the imaging device 202 is an image signal output based on a recording instruction with the release button, the camera body controller 203 executes a compressing process on the image data obtained by the various signal processes to store the compressed data in a storage medium such as a memory card.

The imaging device 202 can convert an optical subject image incident via the interchangeable lens 100 into an image signal and output the converted image signal. The imaging device 202 is realized by a CMOS image sensor or the like. An ultrasonic filter for removing grit and dust and an optical low-pass filter for removing a high-frequency component of incident light may be arranged on the side of an imaging plane of the imaging device 202, but they are not shown in FIG. 1.

The liquid crystal monitor 210 can display an image based on the image data generated by the camera body controller 203. The liquid crystal monitor 210 may be a display apparatus composed of a display device such as, for example, an organic EL monitor other than a liquid crystal panel.

2. Operation

2-1. Exit Pupil Distance

Figure 2:
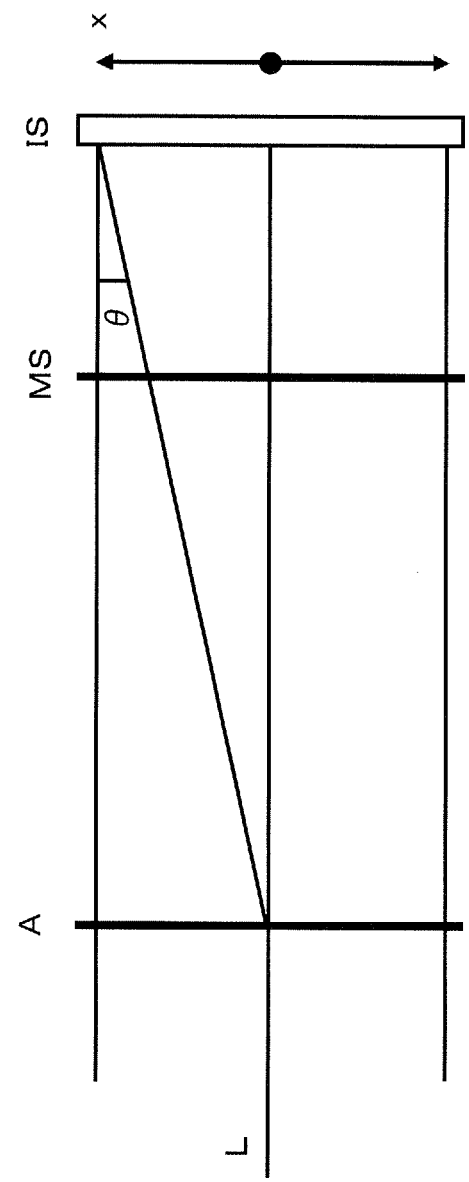
FIG. 2 is a diagram for explaining an exit pupil distance.

An exit pupil distance is described with reference to FIG. 2. In FIG. 2, "L" represents an optical axis, "A" represents a position of the diaphragm unit 103, "MS" represents a position of the mechanical shutter 220, and "IS" represents an imaging plane of the imaging device 202. "θ" represents an incident angle of subject light with respect to the imaging plane IS.

Figure 3:
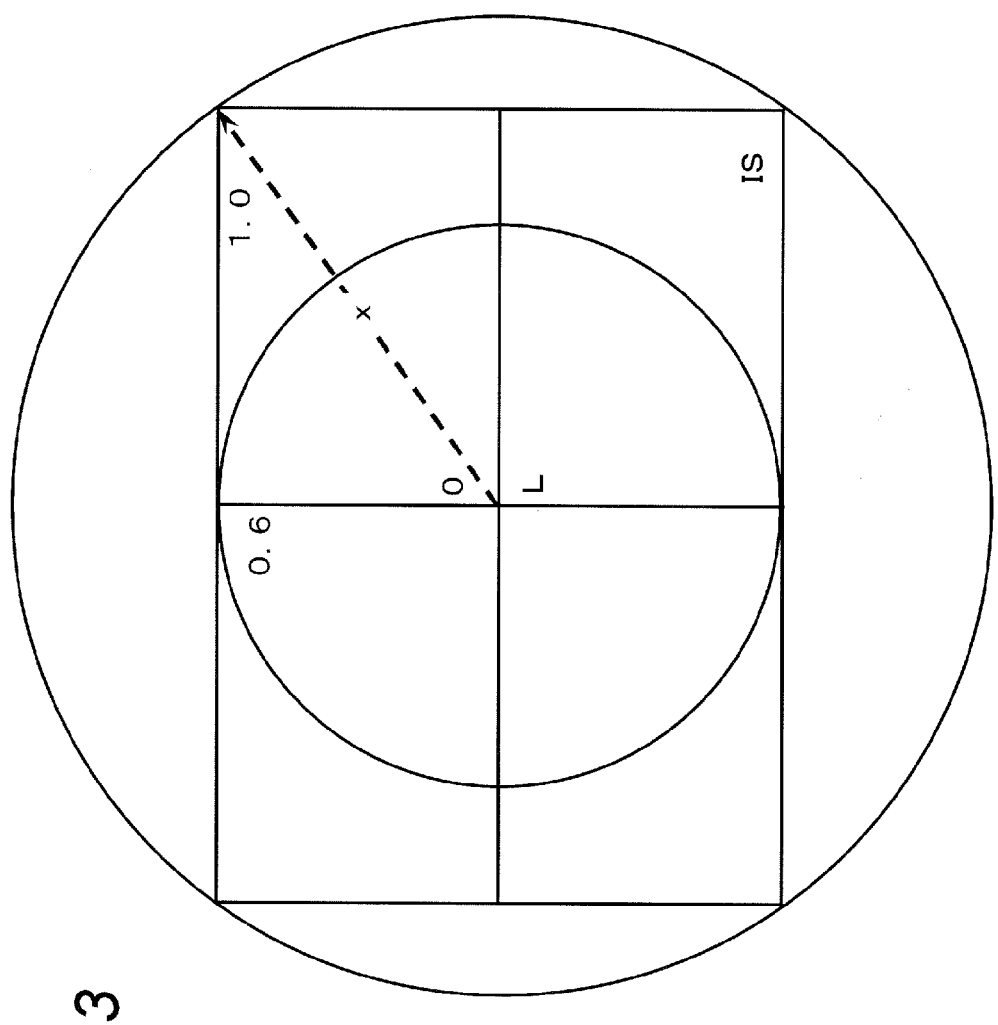
FIG. 3 is a diagram for explaining an image height in the imaging device.

FIG. 3 is a diagram for explaining an image height of the imaging device 202. The image height x is given as a distance from the optical axis L on the imaging plane IS (definitely, an intersection point O between the imaging plane IS and the optical axis L). For example, the image height x is about 0.6 at a center portion on an end of a long side of the imaging plane IS. The image height x is 1.0 at an apex of the imaging plane IS. Since the image height x is a value varying according to the distance from the optical axis L on the imaging plane IS, this value changes concentrically about the intersection point O and does not become a negative value. FIG. 3 illustrates a case where an aspect ratio of the imaging device 202 (that is, the imaging plane IS) is 3:4. As the aspect ratio of the imaging device 202 varies, the above numerical value varies.

With the image height represented by x and the incident angle of the subject light with respect to the imaging plane IS represented by θ, the exit pupil distance is obtained according to a formula (1).

$$\text{Exit pupil distance} = x/\tan\theta \quad (1)$$

That is to say, the exit pupil distance is expressed by a function of the image height x and the incident angle θ.

2-2. Image Height

Figure 4:
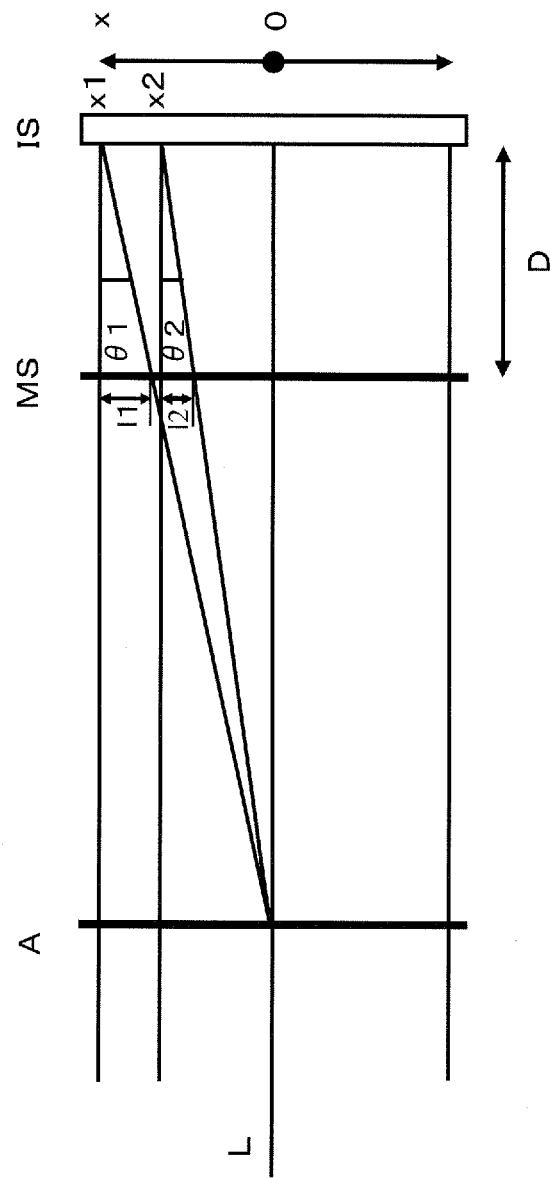
FIG. 4 is a diagram for explaining an influence of the image height on uneven brightness.

FIG. 4 is a diagram for explaining an influence of the image height on brightness unevenness which would be caused in the electronic front curtain operation. When an incident angle at an image height x1 is represented by θ1, an incident angle at an image height x2 is represented by θ2 and x1>x2, θ1>θ2. When a distance from the position MS of the mechanical shutter 220 to the imaging plane IS is represented by D and distances on the position MS of the mechanical shutter 220 corresponding to the incident angles θ1 and θ2 are represented by l1 and l2, l1 and l2 are derived by the following formulas.

$$l1 = D \times \tan\theta1 \quad (2a)$$

$$l2 = D \times \tan\theta2 \quad (2b)$$

Therefore, l1>l2. That is to say, a region on the position MS of the mechanical shutter 220 at which light flux imaged at a certain image height passes changes according to the image height. Concretely, the higher the image height is, the larger the region on the position MS of the mechanical shutter 220 at which the light flux imaged at that image height passes is. That is to say, if exposure time is not comparatively decreased on a position of the imaging plane IS with the large image height x, an exposure amount is comparatively large. On the contrary, if the exposure time is not comparatively increased on a position of the imaging plane IS with the small image height x, the exposure amount is comparatively small.

However the imaging device 202 can reset the electric charges only per line. On the other hand, a plurality of pixels with different image heights x is present on one line. For example, in FIG. 3, the image height can be 0.6 to 1.0 on the pixels on the most-end line of the long side of the imaging plane IS. However, in the imaging device 202, the electric charges are reset per line, the rear curtain 222 of the mechanical shutter 220 runs from up to down cutting off the subject light sequentially on each line of the imaging device 202. Therefore, even when the pixels with the image heights of 0.6 to 1.0 are present on one line, the brightness unevenness in a horizontal direction of the imaging device 202 does not occur because the exit pupil distances are uniform. However, in a vertical direction of the imaging device 202, it is required to perform a reset control on each pixel of the imaging device 202 or a correction of the brightness unevenness on the image data by the camera body controller 203, according to lens characteristics.

Figure 5:
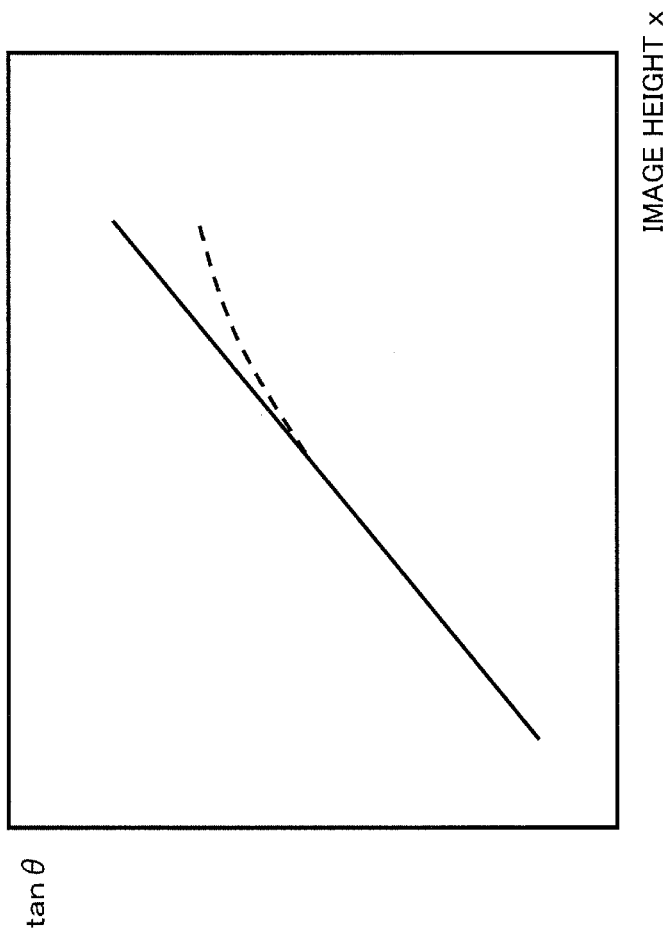
FIG. 5 is a graph illustrating a relationship between an image height and an incident angle.

A relationship between an image height x and an incident angle θ is considered. FIG. 5 shows a relationship between an image height and an incident angle. The solid line shows a relationship between an image height x and an incident angle θ (tan θ) in an optical system including no aspherical lens. The broken line shows a relationship between an image height x and an incident angle θ (tan θ) in an optical system including an aspherical lens. In the optical system (solid line) including no aspherical lens, the image height x and the incident angle θ (tan θ) generally have a linear relationship. Whereas in the optical system (broken line) including an aspherical lens, the image height x and the incident angle θ (tan θ) maintain the linear relationship until a certain image height. However, when the image height exceeds the certain value, the linear relationship may not be maintained. When the image height x and the incident angle θ (tan θ) do not have the linear relationship, there are different exit pupil distances on the same line. That is, the brightness unevenness also occurs in a lateral direction of the imaging device 202.

In the present embodiment, therefore, the data storage unit 107 of the interchangeable lens 100 stores the exit pupil distance of the interchangeable lens 100 and correction amount of the exit pupil distance according to the image height x. The camera body controller 203 obtains the exit pupil distance of the interchangeable lens 100 and the correction amount of the exit pupil distance according to the image height x stored in the data storage unit 107 via the communication unit 201 and the communication unit 106. Using these pieces of information, the camera body controller 203 then corrects brightness unevenness in the vertical direction of the image data. Details of the brightness unevenness correcting process are described later.

2-3. Vignetting

Figure 6:
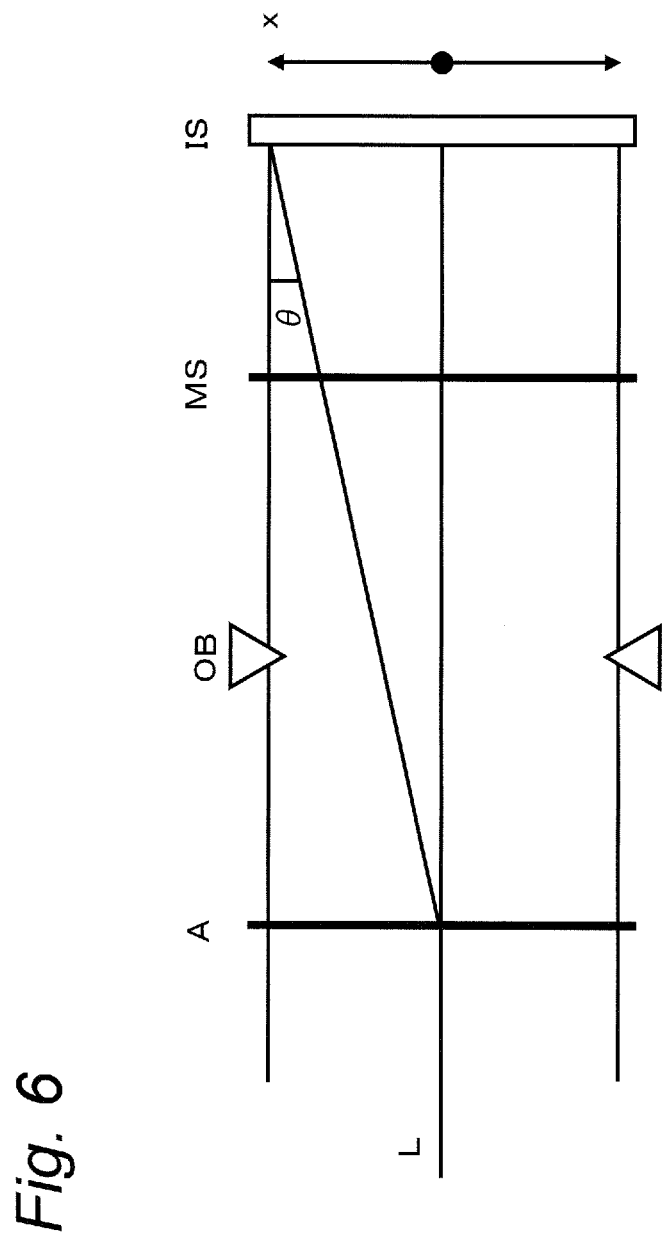
FIG. 6 is a diagram for explaining vignetting.

Inevitable vignetting may occur depending on a structure of a lens barrel containing an optical system. FIG. 6 is a diagram for explaining vignetting. In FIG. 6, vignetting of the partial incident light occurs due to the structure OB of the lens barrel. Further, vignetting of the partial incident light may occur due to a lens disposed closer to a side of the imaging device 202 than to the diaphragm unit 103, such as edges of the zoom lens 102 and a focus lens 104 in FIG. 1.

Figure 7B:
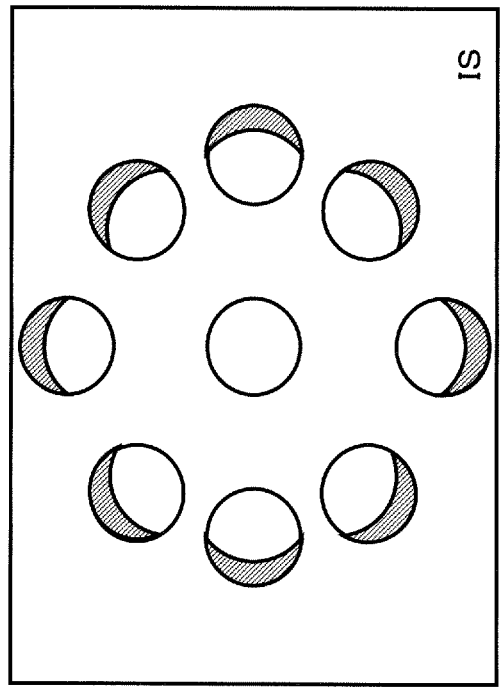
FIGS. 7A and 7B are diagrams for explaining an influence of the vignetting.
Figure 7A:
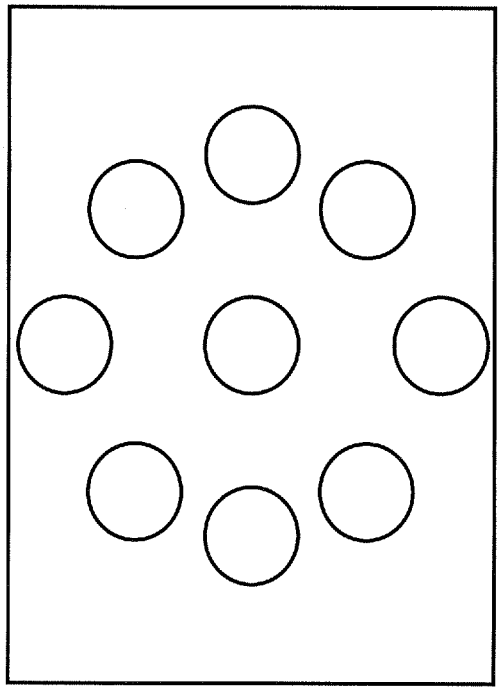

FIGS. 7A and 7B are diagrams for explaining an influence of the vignetting. FIG. 7A illustrates subjects, and FIG. 7B illustrates subject images imaged on the imaging plane IS. Portions indicated by hatched lines in FIG. 7B show portions of the subject images that are not imaged on the imaging plane IS due to vignetting. The subjects are nine true circles, but in the subject images imaged on the imaging plane IS as shown in FIG. 7B, the portions indicated by the hatched lines are lacking or the brightness on that portions is deteriorated.

It is clear from FIG. 6, whether vignetting occurs and it is clear that a degree of vignetting depend on the aperture value of the diaphragm unit 103. Since vignetting may occur, whether vignetting occurs and the degree of vignetting depend also upon the image height x.

Figure 8A:
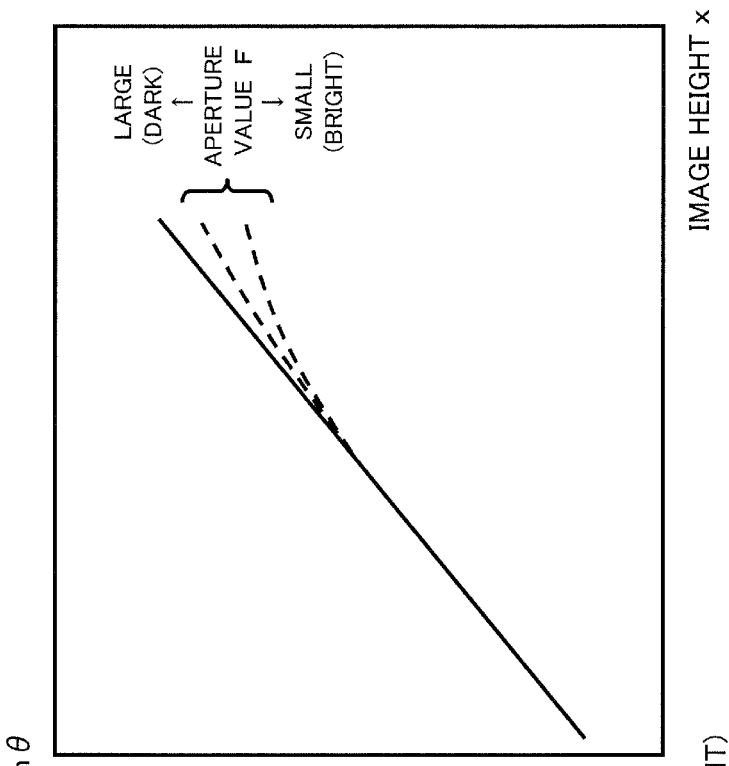
FIGS. 8A and 8B are graphs illustrating a relationship among a aperture value, an image height and an incident angle.
Figure 8B:
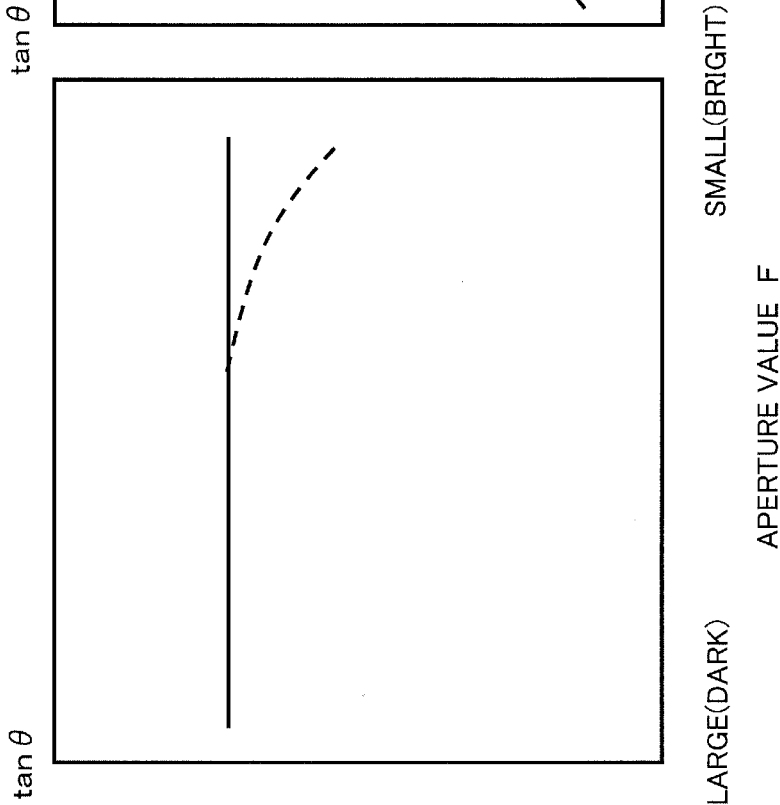

FIGS. 8A and 8B are graphs illustrating a relationship among the aperture value, the image height and the incident angle. FIG. 8A is the graph illustrating a relationship between the aperture value F and the incident angle θ (tan θ) on a position where the image height is large. Vignetting does not exert an influence at the position where the image height is small. In FIG. 8A, the solid line shows a relationship between the aperture value F and the incident angle θ (tan θ) in the optical system which does not cause vignetting. A broken line illustrates a relationship between the aperture value F and the incident angle θ (tan θ) in the optical system which causes vignetting. In the optical system which does not cause vignetting, the incident angle θ (tan θ) does not change according to the aperture value F. On the other hand, in the optical system (broken line) which causes vignetting, the incident angle θ (tan θ) is constant until a certain aperture value. When the aperture value F becomes smaller than the certain aperture value, the incident angle θ (tan θ) also becomes small.

FIG. 8B is the graph illustrating a relationship between the image height x and the incident angle θ (tan θ). Regarding the relationship between the image height x and the incident angle θ (tan θ), there is a problem in a case of the optical system including an aspherical lens shown in FIG. 5 and in a case of the optical system which causes vignetting shown in FIG. 8B. Also in FIG. 8B, a solid line indicates a relationship between the image height x and the incident angle θ (tan θ) in the optical system which does not cause vignetting, and a broken line indicates a relationship between the image height x and the incident angle θ (tan θ) in the optical system which causes vignetting. In the optical system which does not cause vignetting (solid line), the image height x and the incident angle θ (tan θ) have a linear relationship. However, in the optical system which causes vignetting (broken line), the image height x and the incident angle θ (tan θ) maintain the linear relationship until a predetermined image height is reached. However when the image height exceeds the predetermined image height, the linear relationship is not maintained. A degree of a deviation from the linear relationship between the image height x and the incident angle θ (tan θ) varies according to the aperture value F. That is, the smaller the aperture value F is, the larger the deviation from the linear relationship is. The larger the aperture value F is, the smaller the deviation from the linear relationship is.

Therefore, in this embodiment, the data storage unit 107 of the interchangeable lens 100 stores the exit pupil distance of the interchangeable lens 100 and the correction amount of the exit pupil distance according to vignetting. The camera body controller 203 obtains the exit pupil distance of the interchangeable lens 100 and the correction amount of the exit pupil distance according to the vignetting stored in the data storage unit 107 via the communication unit 201 and the communication unit 106, correcting brightness unevenness of image data. Details of the correction of the brightness unevenness are described later.

2-4. Correction Data for Exit Pupil Distance

As stated above, to enable correction of brightness unevenness in consideration of the image height and the vignetting, the data storage unit 107 of the interchangeable lens 100 stores the following correction data:

(1) the exit pupil distance of the optical system at the image height 0;

(2) the correction amount of the exit pupil distance, according to the image height;

(3) the correction amount of the exit pupil distance, according to the vignetting; and (4) the image height to which the correction amount in the item (2) should be applied, or the image height to which the correction amount in the item (3) should be applied.

(1) Exit Pupil Distance of Optical System at Image Height 0

The data storage unit 107 stores the exit pupil distance (hereinafter, "reference exit pupil distance") of the optical system at the image height 0 (intersection point O). At this time, the data storage unit 107 stores a value obtained by multiplying an inverse number of the exit pupil distance by a predetermined coefficient as information representing the exit pupil distance. This allows a number of necessary bits to be reduced. When the inverse number of the exit pupil distance is stored in the data storage unit 107 in advance, a process becomes easy in a subsequent process using the information about the exit pupil distance. In the present embodiment, although the exit pupil distance of the optical system at the image height 0 is used as the reference exit pupil distance, the exit pupil distance of the optical system at another image height may be used as the reference exit pupil distance. For example, the exit pupil distance of the optical system at image height of 0.6 may be used as the reference exit pupil distance.

(2) Correction Amount of Exit Pupil Distance, According to Image Height

As shown in FIG. 5, in the optical system including an aspherical lens, the image height x and the incident angle θ (tan θ) maintain the linear relationship until the predetermined image height. However, when the image height exceeds the predetermined height, the linear relationship may not be maintained (see the broken line in FIG. 5). Therefore, the correction amount (hereinafter, "image height correction amount") for correcting the reference exit pupil distance according to the image height is stored in the data storage unit 107. The image height correction amount is a correction amount that nonlinearly changes according to the image height in the imaging device, and its expressing format is the same as that of the reference exit pupil distance. That is, the image height correction amount has a value expressed by using an inverse number of an exit pupil distance y. Such an expression of the image height correction amount facilitates the subsequent correcting operation.

Figure 9:
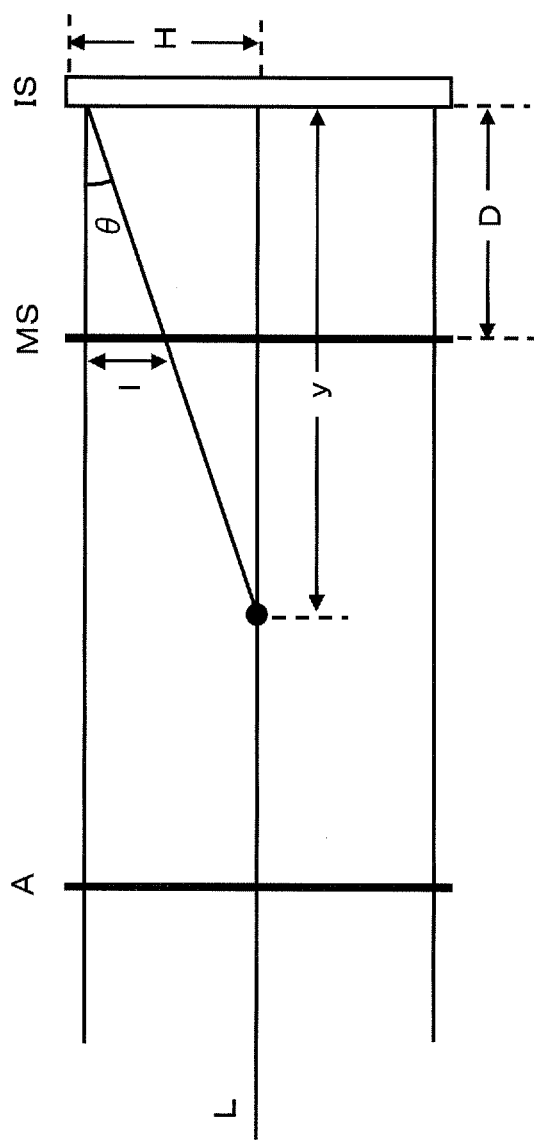
FIG. 9 is a diagram for explaining a correction amount of the exit pupil distance according to the image height.

FIG. 9 is a diagram for explaining the image height correction amount. The distance (the exit pupil distance) from the position MS of the mechanical shutter 220 to the imaging plane IS is denoted by D, and a ½ value of the height of the imaging plane IS is denoted by H. Further, the exit pupil distance is denoted by y, and a distance on the position MS of the mechanical shutter 220 corresponding to the incident angle θ of the imaging plane IS is denoted by I. As a result, a relationship y:H=(y−D):(H−I) is established, and thus the distance I is determined as follows:

$$l = (H \cdot D)/y \qquad (3)$$

The distance l is a slit difference between a case where the electronic front curtain is used and a case where the front curtain of the mechanical shutter 220 is used. An operation timing of electronic front curtain is corrected based on this slit difference l in order to reduce the brightness unevenness (details are described later). As expressed in the formula (3), the slit difference l is proportional to the inverse number of the exit pupil distance y. For this reason, the information about the exit pupil distance and the information about the correction amount of the exit pupil distance are expressed by using the inverse number of the exit pupil distance y. As a result, the computation using these pieces of information becomes simple.

(3) Correction Amount of Exit Pupil Distance, According to Vignetting

As shown in FIG. 8A, in the optical system which causes vignetting, the incident angle θ (tan θ) does not change until a predetermined aperture value is reached, but when the aperture value F is smaller than the predetermined aperture value, the incident angle θ (tan θ) also becomes smaller (see a broken line in FIG. 8A). As shown in FIG. 8B, in the optical system which causes vignetting, the image height x and the incident angle θ (tan θ) maintain the linear relationship until the predetermined image height. However, when the image height exceeds the predetermined height, the linear relationship is not maintained (see a broken line in FIG. 8B). Further, as shown in FIG. 8A, in the optical system which causes vignetting, the deviation from the linear relationship between the image height x and the incident angle θ (tan θ) varies according to the aperture value F. Therefore, the correction amount (hereinafter, "vignetting correction amount") for correcting the reference exit pupil distance according to vignetting is stored in the data storage unit 107. The vignetting correction amount is a correction amount that nonlinearly changes according to the vignetting of the optical system, and its expression format is identical to that of the reference exit pupil distance. The vignetting correction amount is provided in relation to the image height correction amount. The vignetting correction amount can be expressed by an aperture coefficient that is a difference from the maximum aperture (largest opening) of the diaphragm unit 103.

(4) Image Height to which Image Height Correction Amount Should Be Applied, Aperture Value and Image Height to which Vignetting Correction Amount should be Applied The image height to which the image height correction amount should be applied and/or the aperture value and the image height to which the vignetting correction amount should be applied may be stored in the data storage unit 107. As shown in FIG. 5, in the optical system including an aspherical lens, the image height x and the incident angle θ have the linear relationship until a predetermined image height is reached. However, when the image height exceeds the predetermined image height, the linear relationship is not maintained (see the broken line in FIG. 5). Therefore, the image height correction amount is not necessary until the predetermined image height is reached. In a range up to the predetermined image height, instead of 0 as the image height correction amount, a threshold defining a range of the image height to which the correction amount in the item (2) should be applied, namely, a value of the predetermined image height may be stored in the data storage unit 107. As a result, an amount of data to be stored in the data storage unit 107 can be reduced.

As shown in FIG. 8A, in the optical system which causes vignetting, the incident angle θ does not change until a predetermined aperture value is reached. However, when the aperture value F becomes smaller than the predetermined aperture value, the incident angle θ also becomes smaller. Therefore, in the range up to the predetermined aperture value, instead of 0 as the vignetting correction amount, a threshold value defining the range of the aperture value to which the vignetting correction amount should be applied, namely, the predetermined aperture value may be stored in the data storage unit 107. Since the position where the image height is small is not influenced by vignetting, a value of an image height (threshold value) from which the influence of vignetting starts to be exerted may be stored in the data storage unit 107. With this arrangement, the amount of data to be stored in the data storage unit 107 can be also reduced.

The above description describes that the expression format of the image height correction amount is set to be equal to that of the reference exit pupil distance, and the vignetting correction amount can be the aperture coefficient as the difference from the maximum aperture (largest opening) of the diaphragm unit 103. That is, the image height correction amount is added to the reference exit pupil distance, so that the exit pupil distance can be corrected according to the image height. The reference exit pupil distance is multiplied by the vignetting correction amount, so that the exit pupil distance can be corrected according to the vignetting. The reference exit pupil distance may be multiplied by the image height correction amount. The vignetting correction amount may be added to the reference exit pupil distance. Expression formats of the image height correction amount and the vignetting correction amount to be stored in the data storage unit 107 may be any formats.

Figure 10:
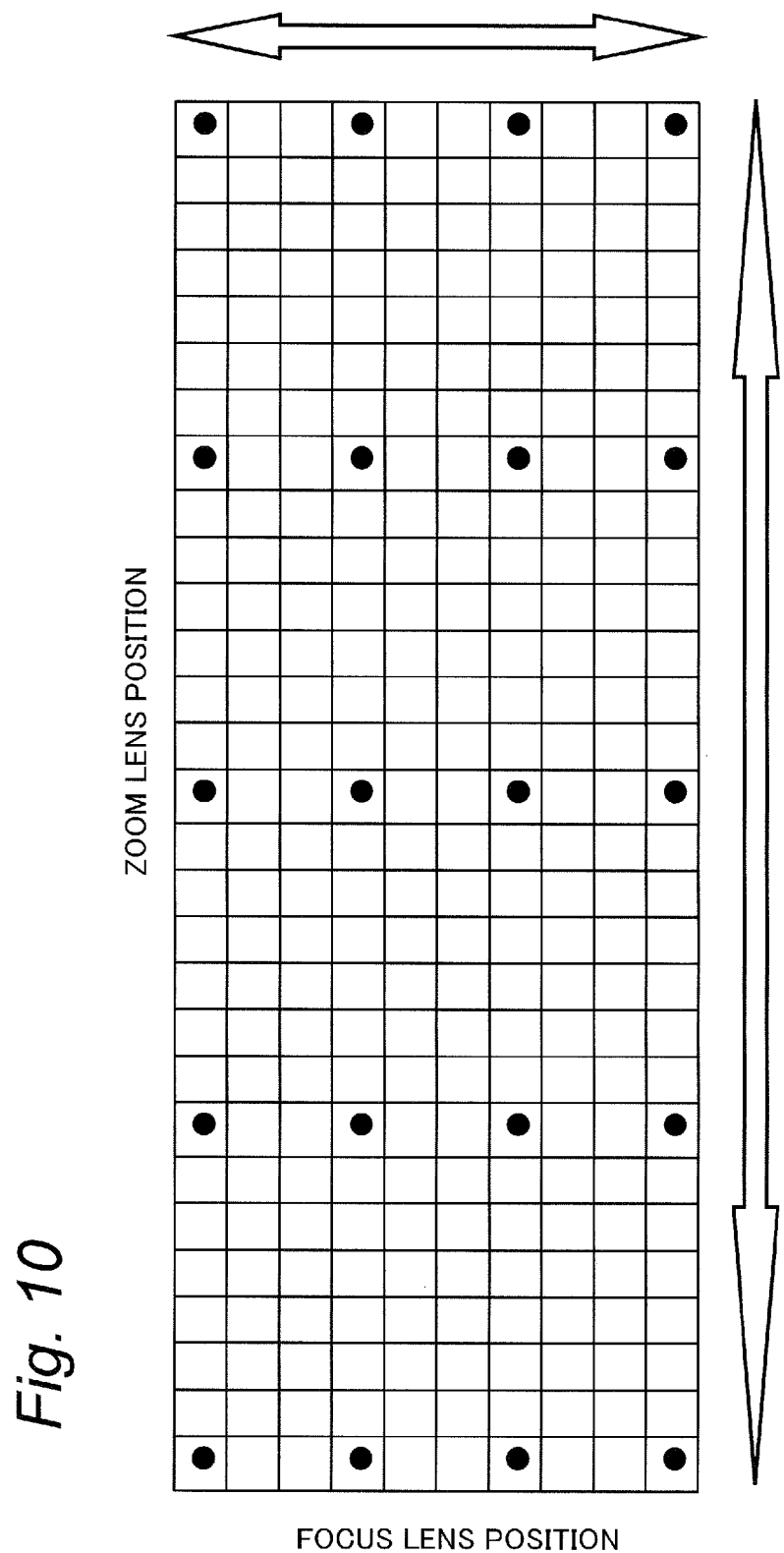
FIG. 10 is a diagram for explaining a relation between a combination of a zoom lens position and a focus lens position, and correction data.

As shown in FIG. 1, in the imaging apparatus according to the first embodiment, the zoom lens 102 and the focus lens 104 are positioned on a side closer to the imaging device 202 than the diaphragm unit 103 in the interchangeable lens 100. Since the zoom lens 102 and the focus lens 104 move forward and backward to the direction of the optical axis L, the positions of the zoom lens 102 and the focus lens 104 influence the exit pupil distance. Therefore, the correction data in the aforementioned items (1) to (4) should be related to the positions of the zoom lens 102 and the focus lens 104 and be stored in the data storage unit 107. FIG. 10 is a diagram for explaining the data that are related to the positions of the zoom lens 102 and the focus lens 104 and are stored in the data storage unit 107. A two-dimensional table is provided based on the positions of the zoom lens 102 and the positions of the focus lens 104, in which the correction data in the items (1) to (4) are related to combinations of the position of the zoom lens 102 and the position of the focus lens 104 and are stored in the data storage unit 107. If the correction data in the items (1) to (4) are related to all the combinations of a position of the zoom lens 102 and a position of the focus lens 104 and stored in the data storage unit 107, the amount of data to be stored in the data storage unit 107 would be very large. Therefore, the correction data in the items (1) to (4) are related to only the combinations of representative positions of the lens, for example, lens positions shown by black circles in FIG. 10 and are stored in the data storage unit 107. In this case, the correction data (1) to (4) related to the combinations of the positions of the zoom lens 102 and the positions of the focus lens 104 other than the typical lens positions can be obtained by interpolation based on data of the typical lens positions.

When any one of the zoom lens 102 and the focus lens 104 is present on a side closer to the subject than the diaphragm unit 103, the table in FIG. 10 becomes a one-dimensional table including only the position of the lens closer to the imaging device 202 than the diaphragm unit 103. Alternatively, when both the zoom lens 102 and the focus lens 104 are present on the side closer to the subject than the diaphragm unit 103, the positions of the zoom lens 102 and the focus lens 104 do not influence the exit pupil distance. For this reason, one set of the data in the items (1) to (4) may be stored in the data storage unit 107 without relating them to the lens positions.

In this table, as the positions of the zoom lens 102 and the focus lens 104, the actual positions of the zoom lens 102 and the focus lens 104 may be managed, or the positions comparatively indicated based on reference positions of the zoom lens 102 and the focus lens 104. When a table for managing the comparative positions with respect to the reference position is used, the interpolating operation may be performed by using values obtained by converting the position comparatively indicated based on the reference position into the actual position of the zoom lens 102 and the focus lens 104. In the example of FIG. 10, five representative points are shown as the zoom lens positions, and four representative points are shown as the focus lens positions, but the number of the representative points is not limited to this, and any number of representative points may be present.

2-5. Relation between Exit Pupil Distance and Brightness Unevenness

Relation between the exit pupil distance and the brightness unevenness is described with reference to FIGS. 11A and 11B. FIG. 11A is a diagram for explaining the correction of the brightness unevenness on an upper half portion of the imaging device 202, and FIG. 11B is a diagram for explaining the correction of the brightness unevenness on a lower half portion of the imaging device 202.

With reference to FIG. 11A, the brightness unevenness that occurs on the upper half portion of the imaging device 202 is described. It is assumed that when the resetting of one line Ru of the imaging device 202 is ended in the operation of the electronic front curtain, the rear curtain 222 of the mechanical shutter 220 runs at the position MS. The exposure time of the line Ru at this time is considered.

The exposure with the electronic front curtain and the rear curtain 222 of the mechanical shutter 220 is carried out during a period from end of resetting of the line Ru to arrival of the rear curtain 222 of the mechanical shutter 220 at a position T0. Therefore, the exposure amount at that time is "E". In view of the exit pupil distances y1 and y2, the incident angle with respect to the exit pupil distance y2 is larger than the incident angle with respect to the exit pupil distance y1. When the exit pupil distance is y1, the time elapsing from the end of the resetting of the line Ru to the arrival of the rear curtain 222 of the mechanical shutter 220 at a position T1 becomes the exposure time, so that the exposure amount is E1. When the exit pupil distance is y2, the time elapsing from the end of the resetting of the line Ru to the arrival of the rear curtain 222 of the mechanical shutter 220 at a position T2 becomes the exposure time, so that the exposure amount is E2. At this time, E<E1<E2, and the smaller the exit pupil distance is, the larger exposure amount is, resulting in the brightness unevenness.

With reference to FIG. 11B, the correction of the brightness unevenness on the lower half portion of the imaging device 202 is described. It is assumed that when the resetting of one line R1 of the imaging device 202 is ended, the rear curtain 222 of the mechanical shutter 220 runs to the position MS in the vertical direction. The exposure time on the line R1 at that time is considered.

The exposure with the electronic front curtain operation and the rear curtain 222 of the mechanical shutter 220 is carried out during a period from the end of the resetting of the line R1 to the arrival of the rear curtain 222 of the mechanical shutter 220 at the position T0. Therefore, the exposure amount is E. In view of the exit pupil distances y1 and y2, the incident angle with respect to the exit pupil distance y2 is larger than the incident angle with respect to the exit pupil distance y1. When the exit pupil distance is y1, the time elapsing from the end of the resetting of the line R1 to the arrival of the rear curtain 222 of the mechanical shutter 220 at the position T1 becomes the exposure time, so that the exposure amount is E1. When the exit pupil distance is y2, the time elapsing from the end of the resetting of the line R1 to the arrival of the rear curtain 222 of the mechanical shutter 220 at the position T2 becomes the exposure time, so that the exposure amount is E2. At this time, E>E1>E2, and the smaller the exit pupil distance is, the smaller the exposure amount is, resulting in the brightness unevenness.

2-6. Brightness Unevenness Correcting Process

The brightness unevenness correcting process in the imaging apparatus according to the first embodiment is described.

2-6-1. Correction of Exit Pupil Distance

First, the process for correcting the exit pupil distance is concretely described. The data storage unit 107 of the interchangeable lens 100 stores the correction data according to the items (1) to (4) for the predetermined number of lens positions indicated by the black circles as shown in FIG. 10. The camera body controller 203 obtains the data stored in the data storage unit 107 from the interchangeable lens 100 at a predetermined timing. For example, when the camera body 200 is powered on and/or the interchangeable lens 100 is attached to the camera body 200, the camera body controller 203 obtains the data stored in the data storage unit 107 of the interchangeable lens 100. The camera body controller 203 may obtain the data stored in the data storage unit 107 every time of recording an image (taking an image).

When an image signal output from the imaging device 202 is an image signal output based on an instruction with the release button for a start of image recording, the camera body controller 203 corrects the brightness unevenness based on the corrected exit pupil distance.

Specifically, the camera body controller 203 obtains the position of the zoom lens 102, the position of the focus lens 104 and the aperture value of the diaphragm unit 103 at the time of recording an image from the interchangeable lens controller 105 via the communication unit 201 and the communication unit 106.

When the position of the zoom lens 102 and the position the focus lens 104 at the time of recording an image are identical to those of the correction data stored in the data storage unit 107 (the positions of the black circles in FIG. 10), the camera body controller 203 uses those data. The camera body controller 203 corrects the reference exit pupil distance based on the image height correction amount to obtain the corrected exit pupil distance at each image height. At this time, when the camera body controller 203 obtains the information about the image height to which the image height correction amount should be applied from the data storage unit 107, the camera body controller 203 uses the reference exit pupil distance, as it is, for a region of the imaging device 202 with an image height (hereinafter, "the threshold image height") less than the image height represented by the information. For a region of the imaging device 202 with image height not less than the threshold image height, the camera body controller 203 corrects the reference exit pupil distance based on the image height correction amount to obtain the corrected exit pupil distance for each height.

After the correction of the exit pupil distance according to the image height, the exit pupil distance may be corrected in view of vignetting. The camera body controller 203 corrects the corrected exit pupil distance for each image height based on the vignetting correction amount to obtain the corrected exit pupil distance for each image height in view of the vignetting. At this time, when the camera body controller 203 obtains the information about the aperture value (hereinafter, "threshold aperture value") and the image height to which the correction amount should be applied from the data storage unit 107, the aperture value of the diaphragm unit 103 at the time of recording an image is first compared with the threshold aperture value. When the aperture value of the diaphragm unit 103 at the time of recording an image is larger than the threshold aperture value, "the corrected exit pupil distance for each image height in view of vignetting" does not have to be obtained. Whereas the aperture value of the diaphragm unit 103 at the time of recording an image is not more than the threshold aperture value, "the corrected exit pupil distance for each image height in view of vignetting" is obtained. At this time, the corrected exit pupil distance for each image height is corrected only for the region of the image height not less than the threshold image height on the imaging device 202 based on the vignetting correction amount, resulting in the corrected exit pupil distance for each image height in view of vignetting.

On the other hand, when the position of the zoom lens 102 and the position of the focus lens 104 at the time of recording image are not identical to the lens positions of the correction data stored in the data storage unit 107 (the positions of the black circles in FIG. 10), the camera body controller 203 searches for the four combinations indicated by the black circles that are the closest to the combination of the position of the zoom lens 102 and the position of the focus lens 104 at the time of recording an image. The camera body controller 203 obtains the corrected exit pupil distance for each image height and/or the corrected exit pupil distance for each image height in view of vignetting for the four combinations similarly to the above case. The camera body controller 203 obtains the corrected exit pupil distances corresponding to the positions of the zoom lens 102 and the focus lens 104 at recording an image, by interpolation of the corrected exit pupil distance for each image height and/or the corrected exit pupil distance for each image height in view of vignetting, which are obtained for each of the four combinations.

Figure 12:
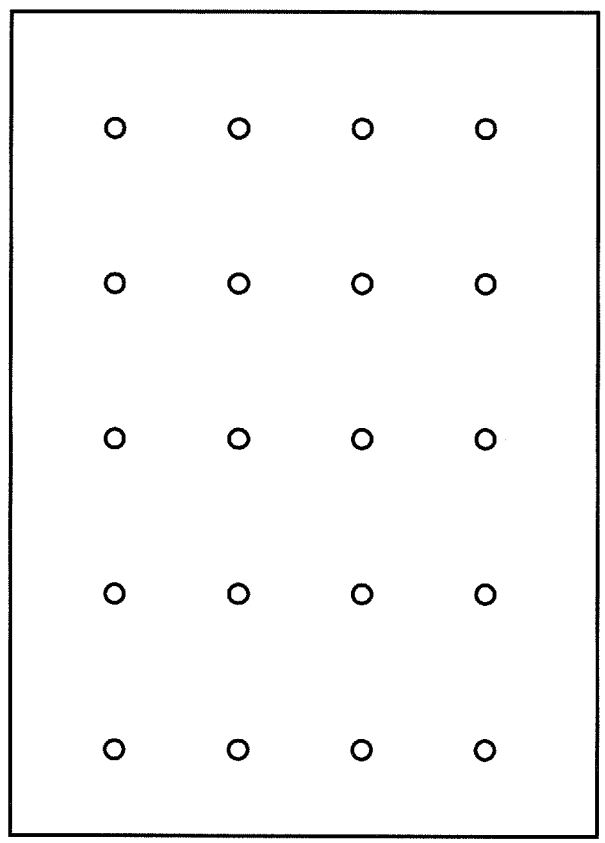
FIG. 12 is a diagram for explaining representative points of an image.

In the above manner, "the corrected exit pupil distance for each image height" and "the corrected exit pupil distance for each image height in view of vignetting" can be obtained. FIG. 12 is a pattern diagram describing representative points of an image. Circular marks in FIG. 12 indicate the representative points of the image. "The corrected exit pupil distance for each image height" and "the corrected exit pupil distance for each image height in view of vignetting" may be obtained only for the representative points of the image. "The corrected exit pupil distance for each image height" and "the corrected exit pupil distance for each image height in view of vignetting" on positions other than the representative points are obtained by interpolation based on the values obtained by representative points. Such an arrangement can greatly reduce amount of an operation.

2-6-2. Correction of Brightness Unevenness

The camera body controller 203 obtains the reference exit pupil distance, the image height correction amount, and the vignetting correction amount of the interchangeable lens 100 stored in the data storage unit 107 via the communication unit 201 and the communication unit 106, and corrects brightness unevenness of the image data using the obtained information.

The camera body controller 203 suitably corrects the reset timing of the imaging device 202 in the electronic front curtain operation to correct the brightness unevenness.

Figure 13:
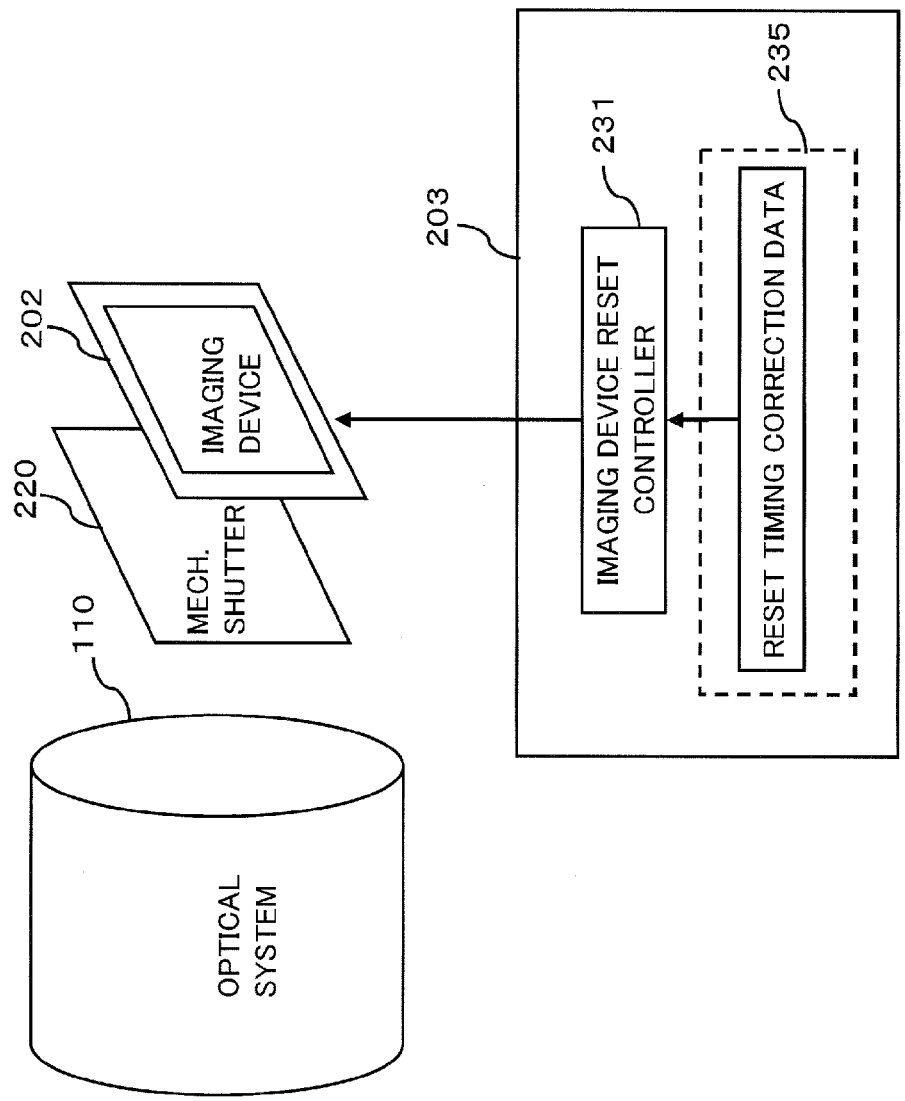
FIG. 13 is a diagram illustrating a configuration in a camera body controller of the imaging apparatus relating to an operation for correcting unevenness of brightness, according to a first embodiment.

FIG. 13 illustrates a configuration of the camera body controller 203 relating to the brightness unevenness correcting process. The camera body controller 203 includes an imaging device reset controller 231 and a data storage unit 235 for storing reset timing data that are used in the brightness unevenness correcting process. The imaging device reset controller 231 controls timing of an operation for resetting pixels of the imaging device 202 during the electronic front curtain operation. The reset timing data to be stored in the data storage unit 235 is data which is used for correcting the reset timing of the imaging device 202 during the front curtain operation and is set according to the exit pupil distance.

The imaging device reset controller 231 controls the reset timing of the imaging device 202 during the electronic front curtain operation based on "the corrected exit pupil distance for each image height" or "the corrected exit pupil distance for each image height in view of vignetting" (hereinafter, simply "the corrected exit pupil distance") to correct the brightness unevenness. Specifically, the imaging device reset controller 231 reads the reset timing correction data from the data storage unit 235 based on the exit pupil distance, and sets the reset timing for each line of the imaging device 202 based on the read reset timing correction data.

Figure 14:
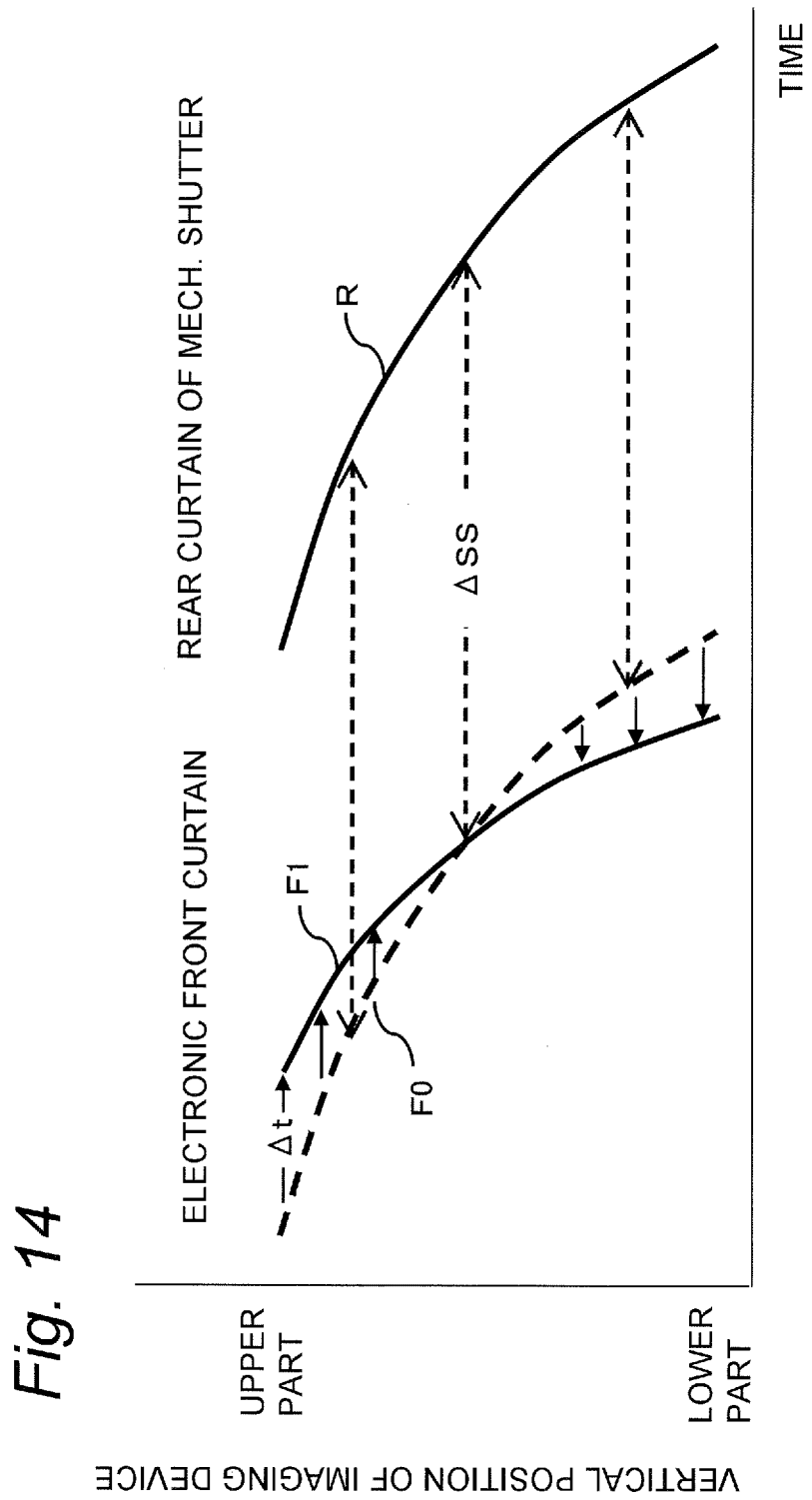
FIG. 14 is a diagram explaining operation timing of a corrected electronic front curtain and a rear curtain of a mechanical shutter.

FIG. 14 is a diagram describing trajectories of the rear curtain 222 of the mechanical shutter 220 and the electronic front curtain running on the imaging device 202. A horizontal axis represents time, and a vertical axis represents the position of the imaging device 202 in the vertical direction. A solid line R represents a running trajectory of the rear curtain 222 of the mechanical shutter 220. A broken line F0 represents a running trajectory of the electronic front curtain in the case where the correction is not carried out, and a solid line F1 represents a running trajectory of the electronic front curtain corrected for the correction of the brightness unevenness.

A gap $\Delta SS$ between the electronic front curtain and the rear curtain 222 of the mechanical shutter 220 is determined by a shutter speed and becomes normally uniform in the vertical direction of the imaging device. That is, when the rear curtain 222 of the mechanical shutter 220 runs along the trajectory of the solid line R, the trajectory of the electronic front curtain is as shown by a broken line F0. As stated above, when the electronic front curtain is adopted, overexposure likely occurs on an upper portion of the imaging device 202, and insufficient exposure likely occurs on a lower part, so that the brightness unevenness occurs.

In order to solve the brightness unevenness, in the present embodiment, the running trajectory of the electronic front curtain is corrected from the trajectory shown by the broken line F0 to a trajectory shown by the solid line F1. Specifically, the imaging device reset controller 231 controls the reset timing of the electronic front curtain so that the gap between the electronic front curtain and the rear curtain 222 becomes small on the upper portion of the imaging device 202 and the gap between the electronic front curtain and the rear curtain 222 becomes large on the lower portion of the imaging device 202.

A shift amount (correction amount) $\Delta t$ from the trajectory F0 to the trajectory F1 is determined according to the exit pupil distance. Specifically, the shift amount (correction amount) $\Delta t$ is obtained based on the distance l which is obtained for the exit pupil distance D according to the formula (3). The data storage unit 235 stores information about the shift amount $\Delta t$ for providing the trajectory F1 for each of various exit pupil distances, as the reset timing correction data.

The imaging device reset controller 231 reads the reset timing correction data according to the corrected exit pupil distance from the data storage unit 235, and corrects the reset timing of the imaging device 202 using the read correction data during the electronic front curtain operation.

As described above, according to the imaging apparatus of the first embodiment, the exit pupil distance is corrected in view of the image height of the imaging device 202. Therefore, the reset timing of the electronic front curtain is controlled in view of the image height, so that the brightness unevenness of an image that would be caused by the electronic front curtain can be accurately corrected.

3. Conclusion

The imaging apparatus according to the first embodiment has the optical system 110 for collecting subject light, the imaging device 202 which has the electronic curtain function and receives the subject light to generate an image signal, the data storage unit 107 for storing the exit pupil distance of the optical system and the correction amount of the exit pupil distance, the mechanical shutter 220 which can cut off the subject light passing through the optical system 110 to the imaging device 202, and the camera body controller 203. The camera body controller 203 obtains the exit pupil distance (the reference exit pupil distance) of the optical system 110, the correction amount of the exit pupil distance (the correction amount at the image height in the imaging device, the correction amount according to vignetting of the optical system) from the data storage unit 107, obtains the corrected exit pupil distance using the obtained exit pupil distance of the optical system and the obtained correction amount of the exit pupil distance, and corrects the brightness unevenness of the image signal based on the corrected exit pupil distance.

The camera body controller 203 controls the reset timing of the electronic front curtain of the imaging device based on the corrected exit pupil distance to correct the brightness unevenness of the image signal.

The imaging apparatus according to the first embodiment corrects the exit pupil distance that influences the brightness unevenness possibly caused by the electronic front curtain operation, according to the image height on the imaging device and/or the vignetting of the optical system, and corrects the brightness unevenness based on the corrected exit pupil distance. With this arrangement, the brightness unevenness caused by electronic front curtain operation can be corrected more accurately.

Second Embodiment

Figure 15:
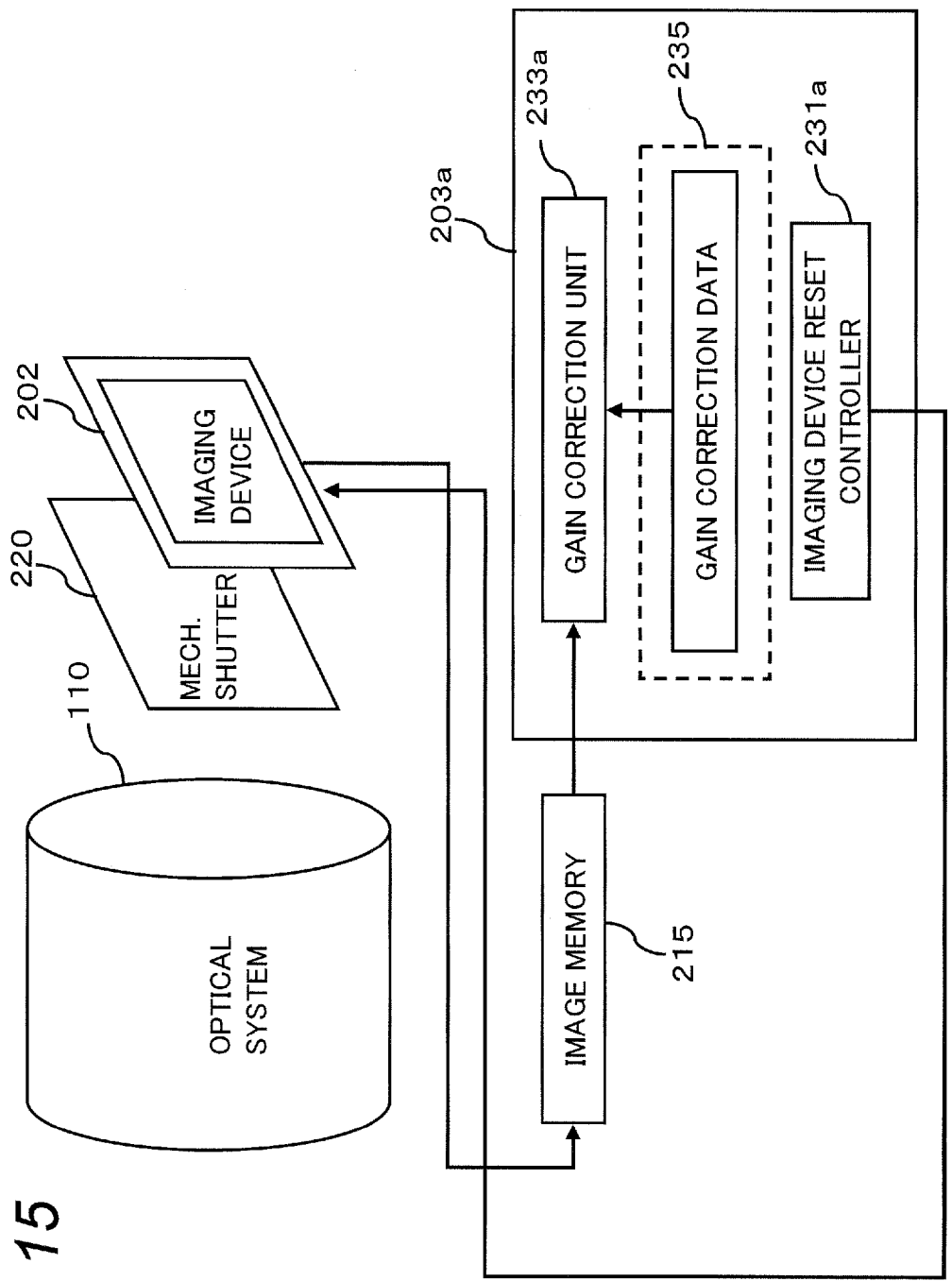
FIG. 15 is a diagram illustrating a configuration in a camera body controller of the imaging apparatus relating to the operation for correcting unevenness of brightness, according to a second embodiment.

In the first embodiment, the reset timing of the electronic front curtain is corrected to suppress the occurrence of the brightness unevenness. In a second embodiment, instead of the correction of the reset timing of the electronic front curtain, a gain of a pixel is regulated to correct the brightness unevenness. FIG. 15 illustrates a main configuration of a camera body controller 203a in the imaging apparatus according to the second embodiment. The configuration and operation other than those described below are similar to those in the first embodiment.

The camera body controller 203a according to the second embodiment includes an imaging device reset controller 231a, a gain correction unit 233a, and the data storage unit 235 that stores gain correction data. The gain correction data stored in the data storage unit 235 is data used for correcting a gain of an image signal per pixel according to the exit pupil distance. An image memory 215 stores an image signal generated by the imaging device 202. The gain correction unit 233a refers to the gain correction data based on the exit pupil distance, and corrects the gains of the respective pixels in the image data read from the image memory 215.

Different methods for correcting gains of the pixels in the gain correction unit 233a are used for an upper half portion and a lower half portion of the imaging device 202 divided by the optical axis L. That is, as described above with reference to FIG. 11, there is the following correlation between the exit pupil distance and the exposure amount. On the upper half portion of the imaging device 202, as the smaller the exit pupil distance is, the larger the exposure amount is. On the lower half portion of the imaging device 202, as the smaller the exit pupil distance is, the smaller the exposure amount is That is, the correlation between the exit pupil distance and the exposure amount is obtained in advance, and a gain according to the exit pupil distance is obtained as the gain correction data based on the correlative relation so that the constant exposure amount can be achieved for the entire image.

The gain correction unit 233a reads the gain correction data with reference to the corrected exit pupil distance and corrects the gain based on the gain correction data. That is, in the correction of the brightness unevenness on the upper half portion of the imaging device 202, the gain correction unit 233a corrects the gain so that the smaller the exit pupil distance is in the vertical direction of the image, the smaller the gain is. Further, in the correction of the brightness unevenness on the lower half portion of the imaging device 202, the gain correction unit 233 corrects the gain based on the corrected exit pupil distance and the gain correction data so that the smaller the exit pupil distance is in the vertical direction of the image, the higher the gain is. Particularly according to the second embodiment, the exit pupil distance is corrected in view of the image height and/or the vignetting, and thus the gain can be corrected more accurately.

Third Embodiment

Figure 16:
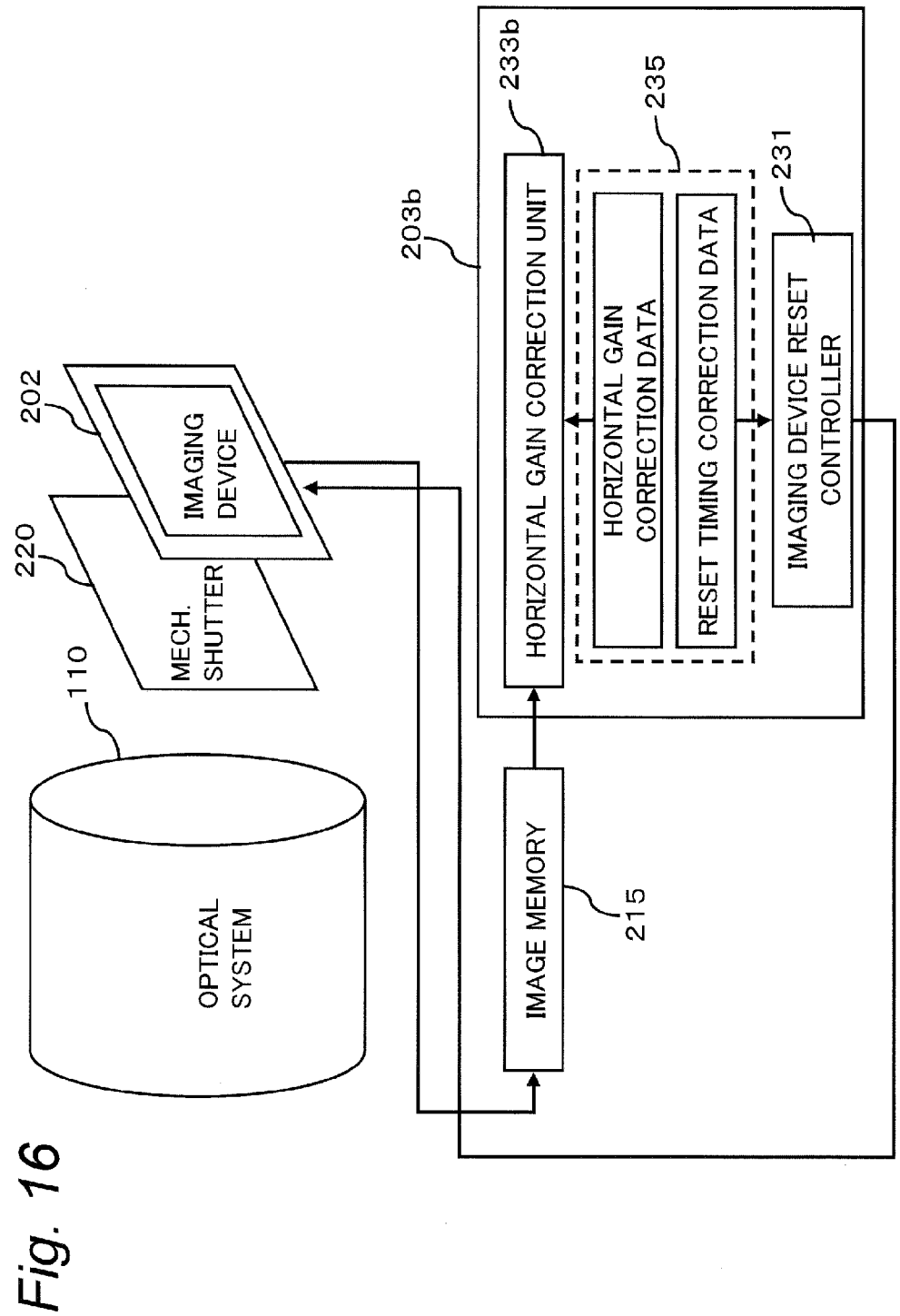
FIG. 16 is a diagram illustrating a configuration in a camera body controller of the imaging apparatus relating to the operation for correcting unevenness of brightness, according to a third embodiment.

The imaging apparatus according to a third embodiment controls the reset timing of the electronic front curtain in the vertical direction of the imaging device 202, and further corrects the gains on the pixels in the horizontal direction. FIG. 16 illustrates a main configuration of the camera body controller for correction of the brightness unevenness according to the third embodiment. The configuration and operation other than those described below are similar to those in the first embodiment.

As shown in FIG. 16, a camera body controller 203b includes a horizontal gain correction unit 233b as well as the configuration in the first embodiment (FIG. 13). The data storage unit 235 stores horizontal gain correction data. The horizontal gain correction data stored in the data storage unit 235 is data which is provided for correcting the gain of the pixels according to the pixel positions to solve the brightness unevenness in the horizontal direction. The horizontal gain correction unit 233b refers to the horizontal correction data and sets gains of the pixels in the image data read from the image memory 215 to correct the brightness unevenness in the horizontal direction.

In the third embodiment, the reset timing of the electronic front curtain is corrected in the vertical direction to correct the brightness unevenness. Further, the gains of the pixels are corrected in the horizontal direction to correct the brightness unevenness. As a result, the brightness unevenness can be corrected more accurately.

In the first to third embodiments, the imaging apparatus including the interchangeable lens 100 and the camera body 200 is described. However, the above idea can be applied also to an imaging apparatus into which the optical system is incorporated. Such an imaging apparatus does not require the communication unit 106 of the interchangeable lens 100 and the communication unit 201 of the camera body 200.

INDUSTRIAL APPLICABILITY

According to the above embodiments, the brightness unevenness of an image caused by the electronic front curtain operation can be satisfactorily corrected. For this reason, the above embodiments are useful to a lens interchangeable imaging apparatus or a lens-integrated imaging apparatus having the electronic front curtain function, or interchangeable lenses and camera bodies in imaging apparatuses having the electronic front curtain function.

What is claimed is:

1. An imaging apparatus comprising:
    an optical system configured to collect subject light;
    an imaging device having an electronic front curtain function, configured to receive the subject light to generate an image signal;
    a data storage unit configured to store an exit pupil distance of the optical system and a correction amount of the exit pupil distance;
    a mechanical shutter capable of cutting off the subject light passing through the optical system to the imaging device; and
    a correction unit configured to obtain the exit pupil distance of the optical system and the correction amount of the exit pupil distance from the data storage unit, obtain a corrected exit pupil distance using the obtained exit pupil distance of the optical system and correction amount of the exit pupil distance, and correct brightness unevenness of the image signal based on the corrected exit pupil distance;
    wherein the correction amount of the exit pupil distance is a correction amount that nonlinearly changes according to a vignetting of the optical system; and
    wherein the exit pupil distance of the optical system is a value expressed by using an inverse number of a value of an exit pupil distance of an optical system.

2. The imaging apparatus according to claim 1, wherein the correction amount of the exit pupil distance is a correction amount that nonlinearly changes according to an image height on the imaging device.

3. The imaging apparatus according to claim 1, wherein the correction unit controls a reset timing of an electronic front curtain of the imaging device to correct the brightness unevenness of the image signal.

4. The imaging apparatus according to claim 1, wherein the correction unit controls gains of pixels of the image signal to correct the brightness unevenness of the image signal.

5. The imaging apparatus according to claim 1, wherein the imaging apparatus is a lens interchangeable type of imaging apparatus.

6. A camera body to which an interchangeable lens is mountable, comprising:
    an imaging device having an electronic front curtain function, configured to generate an image signal from subject light which is received through an optical system of the interchangeable lens;
    a mechanical shutter capable of cutting off the subject light passing through the optical system to the imaging device;
    a communication unit configured to receive an exit pupil distance of the optical system of the interchangeable lens and a correction amount of the exit pupil distance, from the interchangeable lens; and
    a correction unit configured to obtain a corrected exit pupil distance using the received exit pupil distance of the optical system and the received correction amount of the exit pupil distance, and correct brightness unevenness of the image signal based on the corrected exit pupil distance;
    wherein the correction amount of the exit pupil distance is a correction amount that nonlinearly changes according to a vignetting of the optical system; and
    wherein the exit pupil distance of the optical system is a value expressed by using an inverse number of a value of an exit pupil distance of an optical system.

7. The camera body according to claim 6, wherein the correction amount of the exit pupil distance is a correction amount that nonlinearly changes according to an image height on the imaging device.

8. The camera body according to claim 6, wherein the correction unit controls a reset timing of an electronic front curtain of the imaging device to correct the brightness unevenness of the image signal.

9. The camera body according to claim 6, wherein the correction unit controls gains of pixels of the image signal to correct the brightness unevenness of the image signal.

10. An interchangeable lens mountable to a camera body, comprising:
    an optical system configured to collect subject light;
    a data storage unit configured to store an exit pupil distance of the optical system and a correction amount of the exit pupil distance; and
    a communication unit configured to transmit the exit pupil distance of the optical system and the correction amount of the exit pupil distance stored in the data storage unit to the camera body;
    wherein the correction amount of the exit pupil distance is a correction amount that nonlinearly changes according to a vignetting of the optical system; and
    wherein the exit pupil distance of the optical system is a value expressed by using an inverse number of a value of an exit pupil distance of an optical system.

11. The interchangeable lens according to claim 10, wherein the correction amount of the exit pupil distance is a correction amount that nonlinearly changes according to an image height on an imaging device.

* * * * *